United States Patent
Harris et al.

(10) Patent No.: US 6,923,021 B2
(45) Date of Patent: Aug. 2, 2005

(54) METHOD AND APPARATUS FOR FUSED SILICA PRODUCTION

(75) Inventors: Michael D. Harris, Horseheads, NY (US); Robert S. Pavlik, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 466 days.

(21) Appl. No.: 10/034,533

(22) Filed: Dec. 21, 2001

(65) Prior Publication Data

US 2002/0078712 A1 Jun. 27, 2002

Related U.S. Application Data

(60) Provisional application No. 60/257,710, filed on Dec. 21, 2000.

(51) Int. Cl.[7] ............................... C03B 3/00; C03B 5/00
(52) U.S. Cl. ......................... 65/17.4; 65/347; 65/374.1
(58) Field of Search .................... 65/335, 347, 374.13, 65/374.11, 413–414, 416, 421, 17.4, 427, 540, 374.1; 264/41; 501/80

(56) References Cited

U.S. PATENT DOCUMENTS

| | | | |
|---|---|---|---|
| 5,043,002 A | 8/1991 | Dobbins et al. | ............. 65/3.12 |
| 5,332,702 A | 7/1994 | Sempolinski et al. | ....... 501/106 |
| 5,395,413 A | 3/1995 | Sempolinski et al. | ......... 65/414 |
| 5,563,106 A | 10/1996 | Binner et al. | ................. 501/84 |
| 5,705,448 A | 1/1998 | Sambrook et al. | ............ 50/180 |
| 6,210,612 B1 * | 4/2001 | Pickrell et al. | ............... 264/44 |
| 6,574,991 B1 * | 6/2003 | Pavlik et al. | .................. 65/27 |
| 6,592,787 B2 * | 7/2003 | Pickrell et al. | ............... 264/44 |
| 2004/0110022 A1 * | 6/2004 | Pickrell et al. | ............. 428/566 |

FOREIGN PATENT DOCUMENTS

| | | | |
|---|---|---|---|
| EP | 0 978 487 A2 | 2/2000 | ........... C03B/19/14 |
| WO | WO9730933 | 8/1997 | |
| WO | WO 97/30933 * | 8/1997 | ........... C01B/33/12 |
| WO | WO9815505 A1 | 4/1998 | |
| WO | 98/15505 | 4/1998 | |
| WO | 00/29353 | 5/2000 | |

* cited by examiner

Primary Examiner—Steven P. Griffin
Assistant Examiner—Carlos Lopez
(74) Attorney, Agent, or Firm—Timothy M. Schaeberle

(57) ABSTRACT

A fused silica production furnace and methods of producing fused silica are disclosed. The furnace and the methods involve using a foamed refractory having a network of interconnected pores.

8 Claims, 1 Drawing Sheet

METHOD AND APPARATUS FOR FUSED SILICA PRODUCTION

CROSS REFERENCE TO RELATED APPLICATIONS

This application claims the benefit of U.S. Provisional Application Ser. No. 60/257,710, filed Dec. 21, 2000 entitled Foamed Refractories for HPFS Manufacture, by Michael D. Harris and Robert S. Pavlik.

FIELD OF THE INVENTION

This invention relates to refractories. More particularly, the invention relates to porous refractories and fused silica production furnaces that utilize porous refractories.

BACKGROUND OF THE INVENTION

Fused silica and ultra low expansion glass production furnaces produce boules by the deposition of soot or silica particles produced from vaporous or liquid reactants and consolidation of the soot. Such metal oxide soot can be produced by flame hydrolysis of precursors in the form of a vapor or atomized liquid carried by a carrier gas into the flame of a burner or multiple burners. The furnace is surrounded by refractory materials. Refractory materials in these furnaces are exposed to temperatures exceeding 1650° C.

A commercial application of flame hydrolysis involves forming and depositing fused silica soot to form large fused silica containing bodies or boules that may also include dopants added to the fused silica body. These boules may be used individually, or they may be finished into optical members such as lenses, prisms, mirrors, etc. which may be integrated into optical equipment.

FIG. 1 shows a furnace 100 for producing fused silica or ultra low expansion glass. The furnace includes a crown 12 and a plurality of burners 14 projecting from the crown. As noted above, silica particles are generated in a flame when a silicon containing raw material together with a natural gas are passed through the plurality of burners 14 into the furnace chamber 26. These particles are deposited on a hot collection surface of a rotating body where they consolidate to the solid, glass state. The rotating body is in the form of a refractory cup or containment vessel 15 that includes a collection surface 21 and may include lateral walls 17 which surround the boule 19 and provide insulation to the glass as it builds up. The refractory insulation ensures that the collection surface and the crown are kept at high temperatures.

A standard fused silica or ultra low expansion glass production furnace further includes a ring wall 50 which supports the crown 12. The furnace further includes a rotatable base 18 mounted on an oscillation table 20. The base is rotatable about an axis 3. The crown 12, the ring wall 50, the base 18 and the lateral walls are all made from suitable refractory materials, typically zircon refractory materials. The crown in particular is made from sintered, porous zircon refractory bodies in the form of bricks. The bricks making up the crown are arranged in the form of an arched surface, and the individual bricks are usually held into place with a mechanical fastener. One disadvantage associated with using bricks is that each individual brick and fastener is a possible failure point in the furnace crown.

The crown of the furnace is typically made from zircon refractory bricks made from a batch containing primarily milled zircon powder and a burnout material to provide a porous brick. To produce a zircon batch, minor amounts of dispersant and binder are thoroughly mixed in water. The burnout material and the zircon powder are added to the solution in a mixer to produce a pourable slurry. The slurry is poured into molds, and the green bodies produced by this method are dried and fired to release the burn out material and sinter the zircon body. One disadvantage of this process is that the pore size, pore structure and pore distribution are difficult to control. Although the process provides a porous refractory brick, it is difficult to form a network of interconnected pores in the brick. Another disadvantage of this process is that it is difficult to obtain a pore surface area greater than 0.5 $m^2/g$, as measured by the BET method. It is also difficult to produce a brick having porosity greater than 50%, and the density of bricks produced by this method exceeds 2 $g/cm^3$. A brick having a higher porosity and a lower density would allow for the production of more lightweight crown materials. Moreover, it is possible to produce larger refractory shapes and fewer failure points across a furnace structure such as a crown.

Zircon refractories used in fused silica furnace must contain low levels of metallic impurities, and one way of reducing the levels of impurities is through a halogen gas treatment process, which is described in U.S. Pat. No. 6,174,509. Although the process for treating zircon refractories described in U.S. Pat. No. 6,174,509 produces refractories that have a substantially lower levels of metallic impurities than untreated zircon refractories, there continues to be a need for refractory materials that contain and thus introduce even lower levels of impurities to materials produced in the furnace.

It would be desirable to provide a refractory having a high pore surface area and low density, enabling the formation of lightweight refractory shapes larger than conventional refractory bricks. It would also be advantageous to provide a refractory material having controlled pore size and distribution, particularly a refractory material having a network of interconnected pores.

SUMMARY OF INVENTION

One embodiment of present invention relates to a furnace for producing fused silica soot. According to this embodiment, the furnace includes a precursor delivery system for delivering silicon-containing precursor to the furnace and a burner for producing a flame and converting the precursor into a silica-containing soot. The furnace also includes a crown constructed from a foamed refractory material having a network of interconnected pores. In another embodiment, the pores in the foamed refractory material have a surface area greater than 0.5 $m^2/g$. According to another embodiment, the foamed refractory material has a porosity greater than 50%. In still another embodiment, the foamed refractory has a density less than 1.5 $g/cm^3$. In another embodiment, the total iron and sodium impurities in the refractory material are less than 15 parts per million (ppm), and in some embodiments less than 10 ppm.

Another embodiment of the invention relates to a method of manufacturing a fused silica boule. In this embodiment, the method includes the steps of providing a furnace including crown constructed from a foamed refractory material having a network of interconnected pores. This embodiment further includes the steps of introducing a silicon-containing precursor into a flame to produce fused silica parts, collecting the particles on a collection surface and consolidating the particles on the collection surface to form a boule. In another embodiment, the pores in the foamed refractory material have a surface area greater than 0.5 $m^2/g$. In still another embodiment, foamed refractory material has a porosity greater than 50%. According to another embodiment, the foamed refractory has a density less than 1.5 $g/cm^3$. In certain embodiments, the refractory material contains sodium and iron impurities less than 15 ppm.

The furnaces and methods of the present invention are expected to provide a furnace environment having fewer contaminants. In particular, by using foamed refectories that do not use cork or other burnout material to form the pores in the refractories, fewer impurities should be present in the refractory. In addition, a network of interconnected pores facilitates purification of the refractory material by using the halogen gas treatment process described in U.S. Pat. No. 6,174,509.

Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1:
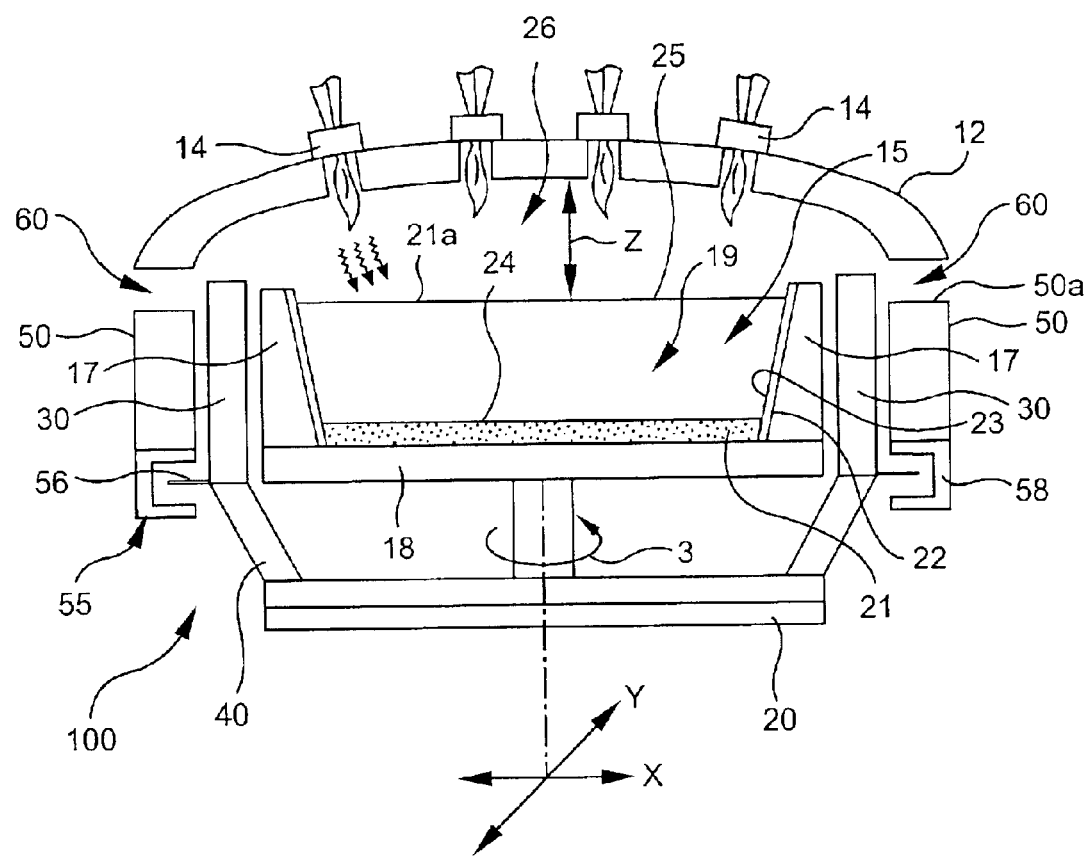
FIG. 1 is a schematic drawing of a furnace used to produce fused silica optical members in accordance with one embodiment of the present invention.

Before describing several exemplary embodiments of the invention, it is to be understood that the invention is not limited to the details of construction and the arrangement of components set forth in the following description or illustrated in the drawings. The invention is capable of other embodiments and of being practiced or being carried out in various ways.

The manufacture of high purity fused silica is known and described in U.S. Pat. No. 5,043,002. In general, the manufacture of fused silica involves the introduction of a silicon-containing precursor into a flame to produce fused silica particles or soot. The flame is provided by a burner, and typically multiple burners 14, in a furnace of the type shown in FIG. 1 that includes a crown 12 and a collection surface. The furnace of the present invention and may or may not include a collection cup or containment vessel. The particles or soot are collected on the collection surface and consolidated to form a boule. This general process of introducing a silicon containing precursor to produce fused silica particles has been adapted to make ultra low expansion glass, which involves depositing fused silica particles containing titania. As used herein, deposition of fused silica particles is not limited to the deposition of pure fused silica particles and includes the deposition of fused silica particles containing other materials such as the type used to make ultra low expansion glass.

According to one embodiment of the invention, the crown of the furnace is made from a foamed refractory material having a network of interconnected pores. Other portions of the furnace may also be manufactured using foamed refractories. As discussed above, the conventional method of making zircon bricks used to make the crown and other portions of the furnace has several limitations. Among the limitations, the conventional method, which involves mixing a burnout material in the batch and burning the burnout material off during sintering of the brick, produces a brick that is porous, but the pores are randomly distributed and not interconnected through the brick. In addition, it is difficult to produce a brick having a pore surface area greater than 0.5 $m^2/g$ or bricks having a porosity greater than 50%. In addition, the density of zircon bricks produced by the conventional method typically have a density greater than 2 $g/cm^3$.

Applicants have discovered that the use of a foamed refractory material has several advantages. Foamed refractories and methods of producing these refractories are described in U.S. Pat. Nos. 5,563,106 and 5,705,448. In general, manufacture of foamed refractories involves providing a dispersion of refractory particles in a liquid carrier and introducing gas into the dispersion. The liquid carrier is removed to provide a porous solid made from bonded particles of the refractory starting materials, and the pores are formed from bubbles of the gas that were introduced into the dispersion. One advantage of using foamed refractories is that foamed refractories include a network of interconnected pores. In addition, the pore structure, size and distribution can be controlled to greater degree than using the conventional process involving burning of a burnout material. Refractories made from a variety of materials, including zircon, can be produced that have a porosity greater than 50%, have a pore surface area greater than 0.5 $m^2/g$ and a density less than 1.5 $g/cm^3$. A refractory having a lower density will allow for the production of larger refractory shapes, particularly refractory shapes having greater length and width dimensions. Larger refractory shapes will provide a furnace structure made up of fewer individual bricks and fasteners, resulting in a structure, such as a furnace crown, having fewer failure points.

Suitable refractory materials used to manufacture the refractories used in fused silica and ultra low expansion glass production furnaces include zircon and zirconia. Zircon ($ZrSiO_4$) and zirconia ($ZrO_2$) are recognized as highly refractory materials. Accordingly, shaped bodies of such materials, such as brick, are frequently employed in conjunction with fused silica and ultra low expansion glass production furnaces. Zircon is more frequently used because of its stability, ease of fabrication and lower cost. Other refractory materials that are utilized in furnaces include, but are not limited to, alumina, silicon carbide and silica.

Another advantage of the present invention is that foamed zircon refractories can be produced that have a lower impurity level than zircon refractories produced according to the conventional process. Applicants have discovered that the refractory purification process described in U.S. Pat. No. 6,174,509, assigned to the assignee of the present patent application, works particularly well in removing impurities from the refractory material. The process described in U.S. Pat. No. 6,174,509 involves exposing a refractory material to a halogen-containing gas to remove metal contaminants from the refractory. According to one embodiment of the present invention, the treatment process is performed in the presence of a reducing agent, for example, a carbon-containing material such as graphite or carbon black. In one embodiment, the halogen treatment process involves the heating the refractory brick in the presence of a halogen gas, such as chlorine, to remove metallic impurities from the material. The reducing agent may include a carbon-containing material, such as a carbon black or graphite.

Halogen gases such as chlorine, fluorine or iodine, alone or in acid gas form, can be used according to the present invention. The halogen gas can be used in essentially pure form. However, as little as 5% of a halogen gas mixed with an inert gas such as helium, argon, or nitrogen, with a longer treatment time, is also effective. The treatment may employ a continuous flow of the halogen gas. Alternatively, a pulsed type treatment may be used wherein gas is repeatedly introduced into the firing chamber and subsequently exhausted.

Treatment of zircon refractories in accordance with certain embodiments of the present invention removed metallic impurities from the foamed refractory material. Foamed zircon refractory materials exposed to a halogen containing gas had iron and sodium impurity levels below 10 parts per million each, and in some embodiments, the combined iron and sodium impurity levels were reduced to below 5 ppm each. In one experiment, exposure to a gas containing halogen reduced the iron impurity to 4.2 ppm and the sodium impurity level to 1.4 ppm. Zircon refractories made by the conventional method and exposed to gas containing halogen typically have sodium levels above 15 ppm and iron levels above 10 parts per million.

Refractories containing lowered impurities, particularly sodium and iron impurities, provide a cleaner furnace atmosphere. Fused silica production furnaces and methods of manufacturing fused silica utilizing foamed refractories in accordance with the present invention in enables the production of a fused silica and ultra low expansion glass products of high purity. Higher purity fused silica glasses are less prone to radiation damage in service. These desired ends are achieved without requiring change in, or compromise of, either the furnace design or the silica forming and deposition process.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of manufacturing a fused silica boule comprising the steps of:

introducing a silicon-containing precursor into a flame to produce fused silica particles; and collecting the particles on a collection surface in a furnace including a crown constructed from a foamed refractory material having a network of interconnected pores, wherein the pores in the foamed refractory material have a surface area greater than 0.5 $m^2/g$, and consolidating the particles on the collection surface to form a boule.

2. The method of claim 1, wherein the foamed refractory material has a porosity greater than 50%.

3. The method of claim 1, wherein the foamed refractory material has a density less than 1.5 $g/cm^3$.

4. The method of claim 1, wherein the foamed refractory material contains iron and sodium impurities less than 10 parts per million.

5. A fused silica soot production furnace comprising:

a precursor delivery system for delivering silicon containing precursor to the furnace;

a burner for producing a flame and converting the precursor into a silica-containing soot; and a crown constructed from a foamed refractory material having a network of interconnected pores, wherein the pores in the foamed refractory material having a surface area greater than 0.5 $m^2/g$.

6. The furnace of claim 5, wherein the foamed refractory material has a porosity greater than 50%.

7. The furnace of claim 5, wherein the foamed refractory material has a density less than 1.5 $g/cm^3$.

8. The furnace of claim 5, wherein the foamed refractory material contains iron and sodium impurities less than 10 parts per million.

* * * * *